United States Patent Office 3,468,845
Patented Sept. 23, 1969

3,468,845
RUBBER COMPOSITIONS STABILIZED WITH MIXTURES OF PHENOLS
Ronald B. Spacht, Hudson, Ohio, assignor to The Goodyear Tire & Rubber Company, Akron, Ohio, a corporation of Ohio
No Drawing. Filed Apr. 7, 1966, Ser. No. 540,837
Int. Cl. C08c 11/30; C08f 45/58
U.S. Cl. 260—45.95
6 Claims This invention relates to the preservation of natural rubber and synthetic rubber-like polymeric materials. More particularly, this invention relates to a new mixture comprising age resistors in natural rubber and in synthetic rubber-like materials.

Various rubber-like polymeric materials are subject to deterioration from sunlight, ozone, atmospheric oxygen, the presence of various metals, and other agents. Both cured and uncured, natural and synthetic rubbers are subject to deterioration. The degree and rate of deterioration vary with the type of rubber, its state of cure, the amount of surface area exposed and the temperature as well as other conditions at which the elastomer is being used. A number of materials can be used as age resistors to substantially reduce such deterioration. It is believed that these age resistors function primarily as antioxidants but the terms "age resistor" and "antioxidant" are used herein to refer to materials for retarding the deterioration of rubber regardless of mechanism.

It is known that dialkylated phenols and trialkylated phenols such as mono-orthoalkylated para-cresols and di-orthoalkylated para-cresols are age-resistors for natural rubber and various synthetic rubbers. However, the mono-orthoalkylated para-cresols are so much less effective as age-resistors than the di-orthoalkylated para-cresols that it is the usual practice to use only the di-orthoalkylated para-cresols. In practice, special purification procedures are used at an additional commercial cost to provide a substantially pure di-orthoalkylated para-cresol for use as an age-resistor for natural and synthetic rubbers.

It was found unexpectedly that mixtures of certain mono-orthoalkylated para-alkyl substituted phenols and di-orthoalkylated para-alkyl substituted phenols when incorporated in a natural rubber or a synthetic rubber composition achieves a higher degree of stabilization of the rubber than is achieved by either the mono-orthoalkylated para-alkyl substituted phenol or the di-orthoalkylated para-alkyl substituted phenol used alone.

Thus, it was found unexpectedly that an improved age resistor for natural and synthetic rubbers comprises a mixture of (A) at least one dialkylated phenol having the structural formula:

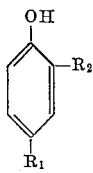

and (B) at least one trialkylated phenol having the structural formula:

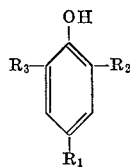

wherein $R_1$ is selected from the group consisting of primary methyl, ethyl, propyl, and butyl radicals and $R_2$ and $R_3$ are selected from the group consisting of tertiary butyl, tertiary amyl, tertiary hexyl, tertiary heptyl, and tertiary octyl radicals. A particularly improved age-resistor for stabilization of natural rubber and synthetic stocks is a mixture of this invention where $R_1$ is a methyl radical and $R_2$ and $R_3$ are tertiary hexyl radicals.

The preferred age-resistor of this invention are mixtures comprising from about 10 to about 70 parts by weight of the mono-orthoalkylated para-alkyl substituted phenol and conversely from about 90 to about 30 parts by weight of the di-orthoalkylated para-alkyl substituted phenol. A particularly useful age resistor of this invention is a mixture comprising from about 15 to about 50 weight percent mono-ortho tertiary hexyl para-cresol and correspondingly from about 85 to about 50 weight percent di-ortho-tertiary hexyl para-cresol.

The age resistors of this invention can be used with various polymeric materials. Rubbery cured and uncured polymers and copolymers are the perferred polymeric materials. Representative examples of the polymeric materials are natural rubber and various synthetic rubbers such as rubbery polymers of conjugated dienes including polybutadiene, polyisoprene, copolymers of butadiene and isoprene which contain a major portion of butadiene, particularly copolymers of butadiene and styrene of the hot and cold SBR type which contain from about 60 to about 80 percent by weight of butadiene, copolymers of butadiene and acrylonitrile, butyl rubber, which is a polymerization product of a major portion of a mono-olefin such as isobutylene and a minor portion of a diolefin such as butadiene or isoprene, copolymers of ethylene and propylene, and terpolymers of ethylene, propylene, and a diene.

An age-resisting amount of the age resistor should be mixed with the natural rubber or synthetic rubber in order to retard the deterioration and oxidation of the rubber. The amount of age resistor used can vary widely. Generally, a suitable age resisting amount of the age-resistor of this invention is from about 0.05 to about 10 parts of age resistor per 100 parts by weight of rubber.

The compositions of this invention can be prepared by alkylating a para-alkyl substituted phenol with a tertiary olefin having from 4 to 8 carbon atoms such as isobutylene, 2-methyl-1-butene, 3-methyl-2-butene, 2-methyl-1-pentene, 2-methyl-2-pentene, 3-methyl-2-pentene, and diisobutylene in the presence of an acidic alkylation catalyst. In this reaction the para-alkyl substituted phenol is alkylated by the tertiary olefins in its positions ortho to the hydroxyl group. In the usual practice of this alkylation reaction, the sum of the mols of the tertiary olefins used is from about 1.5 to about 2.5 mols per mol of the para-alkyl substituted phenol. A slight excess of the tertiary olefins over the theoretical required amount is usually used. The conditions of this alkylation reaction can vary widely. The temperature of the reaction is usually from about 50° C. to about 150° C. and the pressure can be atmospheric or above or below atmospheric.

Various well-known acidic alkylation catalysts can be used in the alkylation reaction. Representative of such catalysts are alkane sulfonic acids, sulfuric acid, benzene sulfonic acid, toluene sulfonic acid, phenol sulfonic acids, activated clays, stannic chloride, ferrous chloride, boron tri-fluoride, zinc chloride, the ferrous and ferric halides, the stannous and stannic halides, aluminum halide and aluminum oxide. The usually preferred alkylation catalysts are sulfuric acid and toluene sulfonic acid. The catalyst will ordinarily be used in an amount of at least 0.5% of the total weight of reactants. Larger amounts of catalyst, such as amounts up to about 10 percent by weight of the reactants are satisfactory.

The reaction product of this alkylation reaction may comprise from about 5 to about 50 weight percent and usually from about 10 to about 30 weight percent mono-orthotertiary alkylated para-alkyl substituted phenol, and from about 95 to about 50 weight percent and usually from about 90 to about 70 weight percent di-orthotertiary alkylated para-alkyl substituted phenol.

In a preferred embodiment of this invention, para-cresol can be reacted with 2-methyl-17-pentene in the presence of toluene sulfonic acid to form a mixture of from about 5 to about 50 weight percent and usually from about 10 to about 30 weight percent of mono-orthotertiary hexyl para-cresol and from about 95 to about 50 weight percent, and usually from about 90 to about 70 weight percent di-orthotertiary hexyl para-cresol.

The following examples further illustrate the invention and are not intended to be limiting. The parts and percentages are by weight unless otherwise indicated.

EXAMPLE 1

To a reactor was charged 1080 parts of para-cresol and 80 parts of toluene sulfonic acid. The mixture was heated to 40° C. and, while stirring, 2000 parts of a hydrocarbon mixture were slowly added to the reactor over a period of 2 hours. The hydrocarbon mixture comprised of approximately 90 percent of 2-methyl-1-pentene obtained by the dimerization of propylene. After stirring for an additional 3 hours, the catalyst was neutralized with aqueous sodium carbonate resulting in an organic layer supported by a water layer. The water layer, which contained the sulfonic acid-sodium carbonate neutralization products, was drained from the reactor. The organic layer was flash distilled under a reduced pressure of about 14 millimeters of mercury pressure absolute to a pot temperature of about 90° C. to remove unreacted hydrocarbons. A residual product yield of 2843 parts of a product was obtained which comprised 5.1 percent mono-orthotertiary hexyl para-cresol, 85.6 percent di-orthotertiary hexyl para-cresol, and 9.3 percent of inert materials.

EXAMPLE 2

To a reactor was charged 216 parts of para-cresol and 16 parts of toluene sulfonic acid. The mixture was heated to 40° C. and, while stirring, 400 parts of a hydrocarbon mixture were slowly added to the reactor over a period of 2½ hours. The hydrocarbon mixture comprised approximately 90 percent of 2-methyl-1-pentene obtained by the dimerization of propylene. After 20 hours the catalyst was neutralized with aqueous sodium carbonate resulting in an organic layer supported by a water layer. The water layer, which contained the sulfonic acid-sodium carbonate neutralization products was drained from the reactor. The organic layer was poured onto an aluminum foil and allowed to dry, yielding a product having a melting point of 39 to 45° C. and comprising 93.6 percent di-orthotertiary hexyl para-cresol, and 3.4 percent mono-orthotertiary hexyl para-cresol, and 3.0 percent of inert materials.

EXAMPLE 3

To a reactor was charged 216 parts of para-cresol and 8 parts of concentrated sulfuric acid. The mixture was heated to 60° C. and, while stirring, 400 parts of a hydrocarbon mixture were added to the reactor over a period of 4 hours. The hydrocarbon mixture comprised approximately 90 percent of 2-methyl-1-pentene obtained by the dimerization of propylene. After stirring for an additional hour, the catalyst was neutralized with aqueous sodium carbonate resulting in an organic layer supported by a water layer. The water layer, which contained the sulfuric acid-sodium carbonate neutralization products, was drained from the reactor. The organic layer was flash distilled under a reduced pressure of about 25 mm. of mercury pressure absolute to a pot temperature of about 120° C. to remove unreacted hydrocarbons. A residual product yield of 520 parts was obtained comprising 83.5 percent di-orthotertiary hexyl para-cresol, 12.8 percent mono-orthotertiary hexyl para-cresol, and 3.7 percent of inert materials.

EXAMPLE 4

To a reactor was charged 432 parts of para-cresol and 16 parts of concentrated sulfuric acid. The mixture was heated to 65° C. and, while stirring, 185 parts of a hydrocarbon mixture were slowly added to the reactor over a period of 2 hours. The hydrocarbon mixture comprised approximately 90 percent of 2-methyl-1-pentene obtained by the dimerization of propylene. After stirring the mixture for an additional 2 hours, the catalyst was neutralized with aqueous sodium carbonate resulting in an organic layer supported by a water layer. The water layer, which contained the sulfuric acid-sodium carbonate neutralization products, was drained from the reactor. The organic layer was distilled into several fractions. The first distillate fraction was obtained by distilling a portion of the organic layer at a reduced pressure of 10 mm. of mercury pressure absolute to a temperature of about 112° C. to yield 178 parts of product. A second distillate fraction was obtained by distilling a portion of the organic layer remaining after the first distillate fraction was removed under a reduced pressure of 8 mm. of mercury pressure absolute to yield 311 parts of product boiling between from about 112 to about 125° C. The second distillate fraction was further distilled under a reduced pressure of 8 mm. of mercury pressure absolute to yield a distillate consisting of 205 parts of mono-orthotertiary hexyl para-cresol boiling between from about 119 to 120° C. and having a melting point of 18.5 to 21.5° C.

EXAMPLE 5

A portion of the reaction product obtained in Example 1 was cooled in an ice-bath while continuously stirring. The product separated into a liquid portion and a solid portion. The liquid portion was separated by filtration and the remaining solid portion dissolved in hexane. The hexane mixture was cooled whereby the mixture separated into a liquid portion and a solid portion. The liquid portion was removed by filtration. The resulting solid portion comprised essentially pure di-orthotertiary hexyl para-cresol having a melting point of 50° C.

EXAMPLE 6

Mixtures of the mono-orthotertiary hexyl para-cresol and the di-orthotertiary hexyl para-cresol prepared in Examples 4 and 5 were mixed with samples of a gum stock of SBR 1006, a hot process polymer prepared by emulsion polymerization containing from approximately 25 parts of bound styrene and 75 parts of bound butadiene. The age resisting effectiveness of the prepared alkylated para-cresols was evaluated by conducting oxygen absorption tests at 90° C. on the samples of SBR 1006 containing the prepared alkylated para-cresols. The oxygen absorption tests were conducted by preparing samples of the SBR 1006 polymer containing 1 part of the prepared alkylated para-cresols and mixtures of the prepared para-cresols per 100 parts of the SBR 1006 polymer. The prepared samples were dissolved in benzene to form a cement. The cements were poured onto an aluminum foil to form thin films. The benzene solvent was removed from the films by evaporation and the dry weight was taken of the samples. The samples were then placed in an oxygen absorption apparatus. The amount of oxygen absorbed in a particular interval of time was measured and recorded in Table I. The procedure used to conduct this test is described in further detail in "Industrial and Engineering Chemistry," volume 43, page 456 (1951), and in "Industrial and Engineering Chemistry," volume 45, page 392 (1953).

TABLE I.—OXYGEN ABSORPTION OF SBR–1006 AT 90° C.

| Age-resistor: | Hrs. to 1% oxygen at 90° C. |
|---|---|
| 100% di-orthotertiary hexyl para-cresol | 475 |
| 100% mono-orthotertiary hexyl para-cresol | 440 |
| 85% di-+15% mono- | 555 |
| 70% di-+30% mono- | 590 |
| 60% di-+40% mono- | 555 |
| 50% di-+50% mono- | 545 |

Di- and mono- refer respectively to di-orthotertiary hexyl para-cresol and mono-orthotertiary hexyl para-cresol.

Thus the mixtures of mono-orthotertiary hexyl para-cresol and 2,6 di-tertiary hexyl para-cresol exhibit a substantially improved age resisting property than that shown by the respective individual alkylated para cresols.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising a rubber selected from the group consisting of natural rubber, synthetic homopolymers of dienes, copolymers of butadiene and styrene, butadiene and acrylonitrile, butyl rubber, ethylene and propylene, and terpolymer of ethylene, propylene and a diene containing, as an age resistor, a stabilizing amount of a mixture comprising (A) at least one dialkylated phenol having the structural formula:

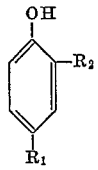

and (B) at least one trialkylated phenol having the structural formula:

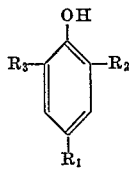

wherein $R_1$ is selected from the group consisting of primary methyl, ethyl, propyl and butyl radicals and $R_2$ and $R_3$ are selected from the group consisting of tertiary butyl, tertiary amyl, tertiary hexyl, tertiary heptyl and tertiary octyl radicals, wherein the mixture comprises from about 10 to about 70 parts by weight of mono-orthoalkylated para-alkyl substituted phenol and conversely from about 90 to about 30 parts by weight of di-orthoalkylated para-alkyl substituted phenol.

2. A composition according to claim 1 wherein the age-resistor mixture comprises mono-orthotertiary hexyl para-cresol and di-orthotertiary hexyl para-cresol.

3. A composition according to claim 2 wherein the age resistor mixture is prepared by reacting para-cresol with 2-methyl-1-pentene in the presence of an acidic alkylation catalyst.

4. The composition of claim 2 where the rubber is a copolymer of butadiene and styrene, 60–80% by weight of which is butadiene.

5. The composition of claim 2 where the rubber is polyisoprene.

6. The composition of claim 2 where the rubber is polybutadiene.

References Cited

UNITED STATES PATENTS

| 3,035,015 | 5/1962 | Spacht | 260—45.95 |
| 3,265,742 | 8/1966 | Spacht | 260—45.95 |
| 2,560,028 | 7/1951 | Kitchen et al. | 260—45.95 |
| 2,581,907 | 1/1952 | Smith et al. | 260—45.95 |
| 2,670,340 | 2/1954 | Kehe | 260—45.95 |
| 3,394,020 | 7/1968 | Bell et al. | 260—45.95 |

DONALD E. CZAJA, Primary Examiner

HOSEA E. TAYLOR, Jr., Assistant Examiner

U.S. Cl. X.R.

252—404, 260—624